(12) United States Patent
Teysseire

(10) Patent No.: US 8,853,341 B2
(45) Date of Patent: Oct. 7, 2014

(54) COMPOSITION FEATURING ENHANCED ADHESION TO POROUS SUBSTRATES

(75) Inventor: Raphael Teysseire, Watt (CH)

(73) Assignee: Sika Technology AG, Baar (CH)

( * ) Notice: Subject to any disclaimer, the term of this patent is extended or adjusted under 35 U.S.C. 154(b) by 640 days.

(21) Appl. No.: 12/318,692

(22) Filed: Jan. 6, 2009

(65) Prior Publication Data

US 2009/0226740 A1 Sep. 10, 2009

(30) Foreign Application Priority Data

Mar. 5, 2008 (EP) .................................... 08152325

(51) Int. Cl.
| | |
|---|---|
| *C08G 77/08* | (2006.01) |
| *C08G 18/28* | (2006.01) |
| *C09J 175/04* | (2006.01) |
| *C08G 18/71* | (2006.01) |
| *C08G 18/10* | (2006.01) |
| *C08G 65/336* | (2006.01) |
| *C08G 65/333* | (2006.01) |

(52) U.S. Cl.
CPC ........ *C08G 65/33355* (2013.01); *C08G 18/289* (2013.01); *C09J 175/04* (2013.01); *C08G 2190/00* (2013.01); *C08G 18/718* (2013.01); *C08G 18/10* (2013.01); *C08G 65/336* (2013.01)
USPC .................. 528/18; 528/17; 528/25; 528/32; 528/30; 528/28; 525/100; 524/588; 428/447; 427/387; 156/329

(58) Field of Classification Search
USPC .................... 528/30, 17, 18, 15, 21; 428/447; 427/387; 156/329; 524/588
See application file for complete search history.

(56) References Cited

U.S. PATENT DOCUMENTS

| | | | |
|---|---|---|---|
| 3,971,751 A | 7/1976 | Isayama et al. | |
| 4,546,018 A * | 10/1985 | Ryuzo et al. | ............... 427/407.2 |
| 5,942,073 A | 8/1999 | Mowrer et al. | |
| 6,191,247 B1 * | 2/2001 | Ishikawa et al. | ................ 528/30 |
| 6,207,766 B1 | 3/2001 | Doi et al. | |
| 6,602,964 B2 * | 8/2003 | Huang et al. | .................. 525/477 |
| 6,649,016 B2 * | 11/2003 | Wu et al. | ...................... 156/329 |
| 7,576,167 B2 * | 8/2009 | Mori et al. | ...................... 528/13 |
| 7,709,588 B2 * | 5/2010 | Kimura et al. | .................. 528/30 |
| 7,960,459 B2 * | 6/2011 | Noro et al. | ..................... 524/195 |
| 2006/0189736 A1 * | 8/2006 | Mori et al. | ..................... 524/404 |
| 2007/0088110 A1 | 4/2007 | Kohl et al. | |
| 2009/0186993 A1 * | 7/2009 | Noro et al. | ..................... 525/474 |
| 2010/0120931 A1 * | 5/2010 | Zajaczkowski et al. | ....... 521/134 |

FOREIGN PATENT DOCUMENTS

| | | |
|---|---|---|
| EP | 0 345 645 A2 | 12/1989 |
| EP | 1 544 225 A1 | 6/2005 |
| EP | 1 749 857 A1 | 2/2007 |
| JP | A-1-306469 | 12/1989 |
| JP | A-4076084 | 3/1992 |
| WO | WO 2005/059056 A1 | 6/2005 |
| WO | WO 2005/108491 A1 | 11/2005 |
| WO | WO 2005/108520 | 11/2005 |
| WO | 2007/094276 * | 8/2007 |

OTHER PUBLICATIONS

Kaneka MS Polymer data sheet, from the internet. Nov. 1, 2011.*
Office Action issued in New Zealand Patent Application No. 575308;mailed Mar. 6, 2009.
Nov. 15, 2011 Office Action issued in Japanese Patent Application No. 2009-051177 (with translation).

* cited by examiner

*Primary Examiner* — Margaret Moore
(74) *Attorney, Agent, or Firm* — Oliff PLC

(57) ABSTRACT

The present invention relates to compositions based on silane-functional polymers that are suitable for the adhesive bonding, sealing and coating of porous substrates, more particularly of porous mineral substrates, and that even after water storage ensure effective adhesion of the composition to the substrate.

22 Claims, No Drawings

COMPOSITION FEATURING ENHANCED ADHESION TO POROUS SUBSTRATES

BACKGROUND OF THE INVENTION

The present invention relates to the field of elastic adhesives, sealants and coatings based on silane-functional polymers.

DESCRIPTION OF THE PRIOR ART

Moisture-curing compositions have been used for some considerable time as elastic adhesives, sealants and coatings.

The adhesive bonding, sealing and coating of porous substrates, more particularly of porous mineral substrates such as concrete and the like on which it is known to be difficult to achieve satisfactory adhesion with elastic adhesives, sealants and coatings, is largely carried out using moisture-curing compositions based on isocyanate. From an environmental and toxicological standpoint, however, such compositions are not suitable for every application.

For this reason, and particularly for adhesion to concrete, moisture-curing compositions based on silane-functional polymers are also employed, the adhesion after water storage of such compositions being a particular problem. One reason for this is that, owing to capillary action in porous materials, water is able to get in between the substrate surface and the adhesion or sealant and hence may weaken the adhesion.

On porous substrates, more particularly porous mineral substrates such as concrete, satisfactory adhesion of adhesives, sealants and coatings based on silane-functional polymers is ensured only in combination with adhesion promoter compositions, referred to as primers. For example, suitable adhesion promoter compositions for moisture-curing compositions of this kind are described in JP 4076084.

For a variety of reasons it may be necessary or of significant advantage to avoid adhesion promoter compositions in the form of undercoats when carrying out adhesive bonding, sealing or coating. For example, primeness adhesive bonding brings not only a cost advantage but also a time advantage, since it is possible to do without the application and ventilation of the adhesion promoter composition. Furthermore, primeness adhesive bonding also has environmental advantages, since primers very often contain large quantities of volatile organic solvents, referred to as VOCs (Volatile Organic Compounds).

SUMMARY OF THE INVENTION

It is an object of the present invention, therefore, to provide a composition based on silane-functional polymers that is suitable for the primeness bonding, sealing and coating of porous substrates, more particularly of porous mineral substrates such as concrete and the like.

Surprisingly it has now been found that compositions according to Claim 1 achieve this object.

The composition of the invention, without the use of adhesion promoter compositions, features durable and effective adhesion to porous substrates, particularly to porous mineral substrates such as concrete and the like. Surprisingly, and in a manner not obvious for the person skilled in the art, the composition of the invention also features good adhesion properties after prolonged water storage.

Moreover, in comparison to conventional systems, compositions of the invention exhibit greatly improved temperature stability in the cured state.

Further aspects of the invention are subject matter of further independent claims. Particularly preferred embodiments of the invention are subject matter of the dependant claims.

DESCRIPTION OF THE PREFERRED EMBODIMENTS

The present invention provides a composition comprising
a) at least one silane-functional polymer P;
b) at least one organosilane which contains at least one sulphur atom; and
c) at least one organotitanate.

Names of substances that begin with "poly", such as polyol or polyisocyanate, in the present document identify substances which formally contain per molecule two or more of the functional groups that occur in their name.

The term "polymer" in the present document embraces firstly a collective of chemically uniform macromolecules which nevertheless differ in respect of degree of polymerization, molar mass and chain length, and having been prepared by a polymerization reaction (polymerization, polyaddition, polycondensation). The term also embraces, secondly, derivatives of such a collective of macromolecules from polymerization reactions, in other words compounds which have been obtained by reactions, such as addition reactions or substitution reactions, for example, of functional groups on existing macromolecules and which may be chemically uniform or chemically non-uniform. The term further embraces what are known as prepolymers—that is, reactive oligomeric preadducts whose functional groups are involved in the construction of macromolecules.

The term "polyurethane polymer" embraces all polymers which are prepared by the process known as the diisocyanate polyaddition process. This also includes those polymers which are virtually or entirely free from urethane groups. Examples of polyurethane polymers are polyether-polyurethanes, polyester-polyurethanes, polyether-polyureas, polyureas, polyester-polyureas, polyisocyanurates and polycarbodiimides.

In the present document the terms "silane" and "organosilane" identify compounds which on the one hand contain at least one, typically two or three, acyloxy groups or alkoxy groups attached directly to the silicon atom via Si—O bonds, and, on the other hand, contain at least one organic radical attached directly to the silicon atom via a Si—C bond. Silanes of this kind are also known to the person skilled in the art as organoalkoxysilanes and organoacyloxysilanes, respectively. Consequently, in accordance with this definition, "tetraalkoxysilanes" are not organosilanes.

Correspondingly, the term "silane group" identifies the silicon-containing group that is attached to the organic radical of the silane that is attached via the Si—C bond. The silanes, or their silane groups, have the property of undergoing hydrolysis on contact with moisture. This hydrolysis is accompanied by the formation of organosilanols, i.e. organosilicon compounds containing one or more silanol groups (Si—OH groups) and, as a result of subsequent condensation reactions, of organosiloxanes, i.e. organosilicon compounds containing one or more siloxane groups (Si—O—Si groups).

The term "silane-functional" identifies compounds which contain silane groups. "Silane-functional polymers", accordingly, are polymers which contain at least one silane group.

Organosilanes identified as "aminosilanes" or "mercaptosilanes" are those whose organic radical contains an amino group or a mercapto group, respectively. "Primary aminosilanes" are aminosilanes which contain a primary amino group, in other words an $NH_2$ group which is attached to one organic radical. "Secondary aminosilanes" are aminosilanes which contain a secondary amino group, in other words an NH group, which is attached to two organic radicals.

In the present document the term "organotitanate" identifies compounds which contain at least one ligand attached to the titanium atom via an oxygen atom.

A "multidentate ligand" or chelate ligand is understood in the present document to be a ligand which possesses at least two free electron pairs and is able to occupy at least two coordination sites on the central atom. A bidentate ligand, accordingly, has the capacity to occupy two coordination sites on a central atom.

The term "primer" is very well known to the person skilled in the art and in the present document identifies a thin layer, of typically thinner than 1 mm, more particularly between 1 and 200 μm, preferably between 1 and 100 μm, of an adhesion promoter composition that is applied as an adhesion undercoat to the surface of a substrate and, where appropriate after ventilation, is contacted with an adhering composition, leading to an improvement in the adhesion of the composition to the substrate. The term "primerless" is used accordingly for the bonding, sealing or coating of substrates without their prior treatment with a primer.

By the "molecular weight" is meant, in the present document, always the average molecular weight $M_n$ (number average).

The composition of the invention comprises at least one silane-functional polymer P which contains, in particular, end groups of the formula (I)

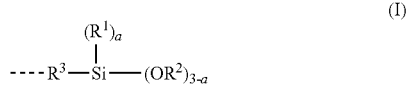
(I)

In this formula the radical $R^1$ stands for an alkyl group having 1 to 8 C atoms, more particularly for a methyl or for an ethyl group.

The radical $R^2$ stands for an acyl or alkyl group having 1 to 5 C atoms, more particularly for a methyl or for an ethyl or for an isopropyl group.

The radical $R^3$ stands for a linear or branched, optionally cyclic, alkylene group having 1 to 12 C atoms, optionally with aromatic fractions, and optionally with one or more heteroatoms, more particularly with one or more nitrogen atoms.

The index a stands for a value of 0 or 1 or 2, more particularly for a value of 0.

Within one silane group of the formula (I), $R^1$ and $R^2$ each independently of one another stand for the radicals described. Thus, for example, possible compounds of the formula (I) include compounds which represent ethoxy-dimethoxyalkylsilanes ($R^2$=methyl, $R^2$=methyl, $R^2$=ethyl).

In a first embodiment the silane-functional polymer P is a silane-functional polyurethane polymer P1 which is obtainable by the reaction of a silane which contains at least one group that is reactive towards isocyanate groups with a polyurethane polymer which contains isocyanate groups. This reaction is carried out preferably in a stoichiometric ratio of the groups that are reactive towards isocyanate groups to the isocyanate groups of 1:1 or with a slight excess of groups that are reactive towards isocyanate groups, and so the resulting silane-functional polyurethane polymer P1 is entirely free from isocyanate groups.

The silane which contains at least one group that is reactive towards isocyanate groups is, for example, a mercaptosilane or an aminosilane, more particularly an aminosilane.

The aminosilane is preferably an aminosilane AS of the formula (Ia),

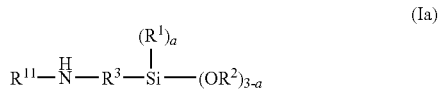
(Ia)

where $R^1$, $R^2$, $R^3$ and a have already been described above, and $R^{11}$ stands for a hydrogen atom or for a linear or branched hydrocarbon radical having 1 to 20 C atoms, which optionally contains cyclic fractions, or for a radical of the formula (VI).

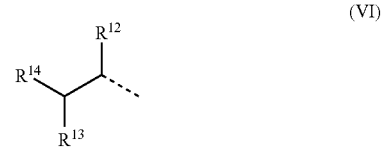
(VI)

In this formula the radicals $R^{12}$ and $R^{13}$, independently of one another, stand for a hydrogen atom or for a radical from the group encompassing —$R^{15}$, —CN and —COOR$^{15}$.

The radical $R^{14}$ stands for a hydrogen atom or for a radical from the group encompassing —CH$_2$—COOR$^{15}$, —COOR$^{15}$, —CONHR$^{15}$, —CON(R$^{15}$)$_2$, —CN, —NO$_2$, —PO(OR$^{15}$)$_2$, —SO$_2$R$^{15}$ and —SO$_2$OR$^{15}$.

The radical $R^{15}$ stands for a hydrocarbon radical having 1 to 20 C atoms which optionally contains at least one heteroatom.

Examples of suitable aminosilanes AS are primary aminosilanes such as 3-aminopropyltrimethoxysilane, 3-aminopropyidimethoxymethylsilane; secondary aminosilanes such as N-butyl-3-aminopropyltrimethoxysilane, N-phenyl-3-aminopropyltrimethoxysilane; the products of the Michael-like addition of primary aminosilanes such as 3-aminopropyltrimethoxysilane or 3-aminopropyldimethoxymethylsilane with Michael acceptors such as acrylonitrile, acrylic and methacrylic esters, acrylamides or methacrylamides, maleic and fumaric diesters, citraconic diesters and itaconic diesters, examples being dimethyl and diethyl N-(3-trimethoxysilylpropyl)aminosuccinate; and also analogues of the stated aminosilanes having ethoxy or isopropoxy groups instead of the methoxy groups on the silicon. Particularly suitable aminosilanes AS are secondary aminosilanes, more particularly aminosilanes AS in which $R^{11}$ in formula (Ia) is other than H. Preference is given to the Michael-like adducts, more particularly diethyl N-(3-trimethoxysilylpropyl)aminosuccinate.

In the present document the term "Michael acceptor" identifies compounds which on the basis of the double bonds they contain, activated by electron acceptor radicals, are capable of entering together with primary amino groups (NH$_2$ groups) into a nucleophilic addition reaction, in a manner analogous to that of Michael addition (hetero-Michael addition).

Examples of suitable polyurethane polymer containing isocyanate groups for the preparation of a silane-functional polyurethane polymer P1 include polymers which are obtainable by the reaction of at least one polyol with at least one polyisocyanate, more particularly a diisocyanate. This reaction can be accomplished by reacting the polyol and the polyisocyanate by typical methods, at temperatures for example of 50° C. to 100° C., where appropriate with the accompanying use of suitable catalysts, the amount of polyisocyanate being selected such that its isocyanate groups are present in a stoichiometric excess in relation to the hydroxyl groups of the polyol.

In particular the excess of polyisocyanate is selected such that, following the reaction of all of the hydroxyl groups of the polyol, the resulting polyurethane polymer retains a free isocyanate group content of 0.1% to 5% by weight, preferably 0.1% to 2.5% by weight, more preferably 0.2% to 1% by weight, based on the overall polymer.

Where appropriate it is possible for the polyurethane polymer to be prepared with the accompanying use of plasticizers, the plasticizers used containing no isocyanate-reactive groups.

Preferred polyurethane polymers are those having the stated free isocyanate group content and obtained from the reaction of diisocyanates with high molecular weight diols in an NCO:OH ratio of 1.5:1 to 2:1.

Suitable polyols for preparing the polyurethane polymer are, in particular, polyether polyols, polyester polyols and polycarbonate polyols, and also mixtures of these polyols.

Suitable polyether polyols, also called polyoxyalkylene polyols or oligoetherols, are especially those which are products of polymerization of ethylene oxide, 1,2-propylene oxide, 1,2- or 2,3-butylene oxide, oxetane, tetra-hydrofuran or mixtures thereof, where appropriate polymerized with the aid of a starter molecule having two or more active hydrogen atoms such as, for example, water, ammonia or compounds having two or more OH or NH groups such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and also mixtures of the stated compounds. Polyoxyalkylene polyols which can be used include both those which have a low degree of unsaturation (measured in accordance with ASTM D-2849-69 and reported in milliequivalents of unsaturation per gram of polyol (meq/g)), prepared for example with the aid of what are called double metal cyanide complex catalysts (DMC catalysts), and those having a higher degree of unsaturation, prepared for example with the aid of anionic catalysts such as NaOH, KOH, CsOH or alkali metal alkoxides.

Particularly suitable are polyoxyethylene polyols and polyoxypropylene polyols, especially polyoxyethylene diols, polyoxypropylene diols, polyoxyethylene triols and polyoxypropylene triols.

Especially suitable are polyoxyalkylene diols or polyoxyalkylene triols having a degree of unsaturation of less than 0.02 meq/g and having a molecular weight in the range from 1000 to 30 000 g/mol, and also polyoxyethylene diols, polyoxyethylene triols, polyoxypropylene diols and polyoxypropylene triols having a molecular weight of 400 to 20 000 g/mol.

Likewise particularly suitable are what are called ethylene oxide-terminated ("EO endcapped", ethylene oxide-endcapped) polyoxypropylene polyols. The latter are special polyoxypropylene-polyoxyethylene polyols which are obtained, for example, by subjecting pure polyoxypropylene polyols, more particularly polyoxypropylene diols and triols, after the end of the polypropoxylation reaction, to further alkoxylation with ethylene oxide, and which as a result contain primary hydroxyl groups. Preference is given in this case to polyoxypropylene-polyoxyethylene diols and polyoxypropylene-polyoxyethylene triols.

Suitability is further possessed by polybutadiene polyols terminated with hydroxyl groups, such as those polyols, for example, which are prepared by polymerizing 1,3-butadiene and allyl alcohol or by oxidizing polybutadiene, and also their hydration products.

Suitability is also possessed by polyether polyols grafted with styrene-acrylonitrile, of the kind available commercially, for example, under the trade name Lupranol® from the company Elastogran GmbH, Germany.

Especially suitable polyester polyols are polyesters which carry at least two hydroxyl groups and are prepared by known methods, more particularly by the polycondensation of hydroxycarboxylic acids or the polycondensation of aliphatic and/or aromatic polycarboxylic acids with alcohols having a hydrocity of two or more.

Especially suitable are polyester polyols which are prepared from dihydric to trihydric alcohols such as, for example, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols with organic dicarboxylic acids or their anhydrides or esters such as, for example, succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid and trimellitic anhydride or mixtures of the aforementioned acids, and also polyester polyols from lactones such as ε-caprolactone, for example.

Particular suitability is possessed by polyester diols, especially those prepared from adipic acid, azelaic acid, sebacic acid, dodecanedicarboxylic acid, dimer fatty acid, phthalic acid, isophthalic acid and terephthalic acid as dicarboxylic acid or from lactones such as, for example, ε-caprolactone and from ethylene glycol, diethylene glycol, neopentyl glycol, 1,4-butanediol, 1,6-hexanediol, dimer fatty acid diol and 1,4-cyclohexanedimethanol as dihydric alcohol.

Particularly suitable as polycarbonate polyols are those of the kind obtainable by reaction, for example, of the above-mentioned alcohols used to synthesize the polyester polyols with dialkyl carbonates such as dimethyl carbonate, diaryl carbonates such as diphenyl carbonate or phosgene. Polycarbonate diols are particularly suitable, especially amorphous polycarbonate diols.

Further suitable polyols are poly(meth)acrylate polyols.

Likewise suitable, furthermore, are polyhydrocarbon polyols, also called oligohydrocarbonols, examples being polyhydroxy-functional ethylene-propylene, ethylene-butylene or ethylene-propylene-diene copolymers, of the kind prepared, for example, by the company Kraton Polymers, USA, or polyhydroxy-functional copolymers of dienes such as 1,3-butanediene or diene mixtures and vinyl monomers such as styrene, acrylonitrile or isobutylene, or polyhydroxy-functional polybutadiene polyols, examples being those which are prepared by copolymerizing 1,3-butadiene and allyl alcohol and which may also have been hydrated.

Additionally suitable are polyhydroxy-functional acrylonitrile/butadiene copolymers of the kind which can be prepared, for example, from epoxides or amino alcohols and carboxyl-terminated acrylonitrile/butadiene copolymers, which are available commercially under the name Hypro® (previously Hycar®) CTBN from the company Emerald Performance Materials, LLC, USA.

These stated polyols preferably have an average molecular weight of 250 to 30 000 g/mol, more particularly of 1000 to 30 000 g/mol, and an average OH functionality in the range from 1.6 to 3.

Particularly suitable polyols are polyester polyols and polyether polyols, especially polyoxyethylene polyol, polyoxypropylene polyol and polyoxypropylene-polyoxyethylene polyol, preferably polyoxyethylene diol, polyoxypropylene diol, polyoxyethylene triol, polyoxypropylene triol, polyoxypropylene-polyoxyethylene diol and polyoxypropylene-polyoxyethylene triol.

Further to these stated polyols it is possible to use small amounts of low molecular weight dihydric or polyhydric alcohols as well, such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as sucrose, other higher polyhydric alcohols, low molecular weight alkoxylation products of the aforementioned dihydric and polyhydric alcohols, and also mixtures of the aforementioned alcohols, when preparing the polyurethane polymer containing terminal isocyanate groups.

As polyisocyanates for preparing the polyurethane polymer it is possible to use commercially available aliphatic, cycloaliphatic or aromatic polyisocyanates, especially diisocyanates.

By way of example these are diisocyanates whose isocyanate groups are attached in each case to an aliphatic, cycloaliphatic or arylaliphatic C atom, and they are also called "aliphatic diisocyanates", such as 1,6-hexamethylene diisocyanate (HDI), 2-methylpentamethylene 1,5-diisocyanate, 2,2,4- and 2,4,4-trimethyl-1,6-hexamethylene diisocyanate (TMDI), 1,12-dodeca-methylene diisocyanate, lysine diisocyanate and lysine ester diisocyanate, cyclohexane 1,3-diisocyanate, cyclohexane 1,4-diisocyanate, 1-isocyanato-3, 3,5-trimethyl-5-isocyanatomethylcyclohexane (i.e. isophorone diisocyanate or IPDI), perhydro-2,4'-diphenylmethane diisocyanate and perhydro-4,4'-diphenylmethane diisocyanate, 1,4-diisocyanato-2,2,6-trimethylcyclohexane (TMCDI), 1,3- and 1,4-bis-(isocyanatomethyl)cyclohexane, m- and p-xylylene diisocyanate (m- and p-XDI), m- and p-tetramethyl-1,3-xylylene diisocyanate, m- and p-tetramethyl-1,4-xylylene diisocyanate, bis-(1-isocyanato-1-methylethyl) naphthalene; and also diisocyanates having isocyanate groups attached to in each case one aromatic C atom, and also known as "aromatic diisocyanates", such as 2,4- and 2,6-tolylene diisocyanate (TDI), 4,4'-, 2,4'- and 2,2'-diphenylmethane diisocyanate (MDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatobiphenyl (TODI); oligomers and polymers of the aforementioned isocyanates, and also any desired mixtures of the aforementioned isocyanates.

Suitable silane-functional polymers P1 are for example available commercially under the trade name Polymer ST50 from the company Hanse Chemie AG, Germany, and also under the trade name Desmoseal® from the company Bayer MaterialScience AG, Germany.

In a second embodiment the silane-functional polymer P is a silane-functional polyurethane polymer P2 obtainable by the reaction of an isocyanatosilane IS with a polymer which has functional end groups that are reactive towards isocyanate groups, especially hydroxyl groups, mercapto groups and/or amino groups. This reaction takes place in a stoichiometric ratio of the isocyanate groups to the functional end groups that are reactive towards isocyanate groups of 1:1, or with a slight excess of the functional end groups that are reactive towards isocyanate groups, at temperatures for example of 20° C. to 100° C., where appropriate with accompanying use of catalysts.

Suitability as isocyanatosilane IS is possessed by compounds of the formula (Ib).

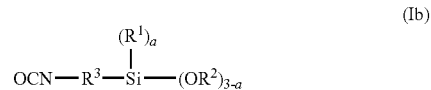

(Ib)

where $R^1$, $R^2$, $R^3$ and a have already been described above.

Examples of suitable isocyanatosilanes IS of the formula (Ib) are 3-iso-cyanatopropyltrimethoxysilane, 3-isocyanatopropyldimethoxymethylsilane, and their analogues having ethoxy or isopropoxy groups instead of the methoxy groups on the silicon.

The polymer preferably contains hydroxyl groups as functional end groups reactive towards isocyanate groups.

Suitable polymers containing hydroxyl groups are on the one hand aforementioned polyoxyalkylene polyols of high molecular weight, preferably polyoxypropylene diols having a degree of unsaturation of less than 0.02 meq/g and having a molecular weight in the range from 4000 to 30 000 g/mol, especially those having a molecular weight in the range from 8000 to 30 000 g/mol.

Also suitable, on the other hand, are polyurethane polymers containing hydroxyl groups, more particularly polyurethane polymers terminated by hydroxyl groups, for the reaction with isocyanatosilanes IS of the formula (Ib). Such polyurethane polymers are obtainable through the reaction of at least one polyisocyanate with at least one polyol. This reaction may take place by the polyol and the polyisocyanate being reacted by typical methods, at temperatures for example of 50° C. to 100° C., where appropriate with accompanying use of suitable catalysts, the amount of the polyol being such that its hydroxyl groups are present in a stoichiometric excess in relation to the isocyanate groups of the polyisocyanate. Preference is given to a ratio of hydroxyl groups to isocyanate groups of 1.3:1 to 4:1, more particularly of 1.8:1 to 3:1. The polyurethane polymer can if appropriate be prepared with accompanying use of plasticizers, in which case the plasticizers used contain no groups that are reactive towards isocyanates. Suitability for this reaction is possessed by the same polyols and polyisocyanates that have already been mentioned as being suitable for preparing a polyurethane polymer containing isocyanate groups and used for preparing a silane-functional polyurethane polymer P1.

By way of example, suitable silane-functional polymers P2 are available commercially under the trade names SPUR+® 1010LM, 1015LM and 1050MM from the company Momentive Performance Materials Inc., USA, and also under the trade names Geniosile STP-E15, STP-10 and STP-E35 from the company Wacker Chemie AG, Germany.

In a third embodiment the silane-functional polymer P is a silane-functional polymer P3 which is obtainable by a hydrosilylation reaction of polymers having terminal double bonds, examples being poly(meth)acrylate polymers or polyether polymers, more particularly of allyl-terminated polyoxyalkylene polymers, described for example in U.S. Pat. No.

3,971,751 and U.S. Pat. No. 6,207,766, the disclosure content of which is hereby incorporated by reference.

By way of example, suitable silane-functional polymers P3 are available commercially under the trade names MS-Polymer® S203(H), S303(H), S227, S810, MA903 and S943, Silyl® SAX220, SAX350, SAX400 and SAX725, Silyl® SAT350 and SAT400, and also XMAP® SA100S and SA310S from the company Kaneka Corp., Japan, and also under the trade names Excestare S2410, S2420, S3430, S3630, W2450 and MSX931 from the company Asahi Glass Co., Ltd., Japan.

Typically the silane-functional polymer P is present in an amount of 10% to 80% by weight, preferably in an amount of 15% to 60% by weight, based on the overall composition.

The composition of the invention further comprises at least one organosilane which contains at least one sulphur atom. Organosilanes of this kind are selected particularly from the group consisting of organosilanes of the formulae (II), (III) and (IV).

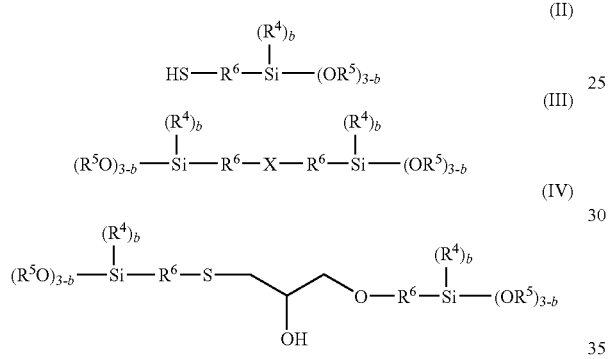

In these formulae the radical $R^4$ stands for an alkyl group having 1 to 8 C atoms, more particularly for a methyl group.

The radical $R^5$ stands for an alkyl group having 1 to 5 C atoms, more particularly for a methyl, an ethyl or for an isopropyl group, or for an acyl group, more particularly for an acetyl group.

The radical $R^6$ stands for a linear or branched, optionally cyclic, alkylene group having 1 to 20 C atoms, optionally with aromatic fractions, and optionally with one or more heteroatoms, more particularly nitrogen atoms.

X stands for S, S2 or for $S_4$ and b stands for a value of 0, 1 or 2.

The organosilane which contains at least one sulphur atom is particularly an organosilane of the formula (II) where the radical $R^5$ stands for a methyl or for an ethyl group, the radical $R^6$ stands for a linear alkylene group having 1 to 10, more particularly having 3, C atoms and b stands for a value of 0.

Examples of suitable organosilanes of the formula (II) are those selected from the group consisting of 3-mercaptopropyltriethoxysilane, 3-mercaptopropyltrimethoxysilane, 3-mercaptopropylmethyldimethoxysilane and 3-acylthiopropyltrimethoxysilane.

Examples of suitable organosilanes of the formula (III) are bis(trialkoxy-silylpropyl)polysulphides such as 4,4,15,15-tetraethoxy-3,16-dioxa-8,9,10,11-tetrathia-4-15-disilaoctadecane or bis(triethoxysilylpropyl)disulphide. For example, one such organosilane is available commercially under the trade name Si 69® from the company Evonik Degussa GmbH, Germany.

Particularly suitable organosilanes of the formula (IV) are the reaction products of organosilanes of the formula (II), such as of 3-mercaptopropyltrimethoxysilane, for example, with glycidyloxyalkyltrialkoxysilanes, such as with 3-glycidyloxypropyltrimethoxysilane, for example.

Suitable organosilanes of the formula (II) are available commercially, for example, under the trade name Dynasylan® MTMO from Evonik Degussa GmbH, Germany, or under the trade name Silquest® A-189 from the company Firma Momentive Performance Materials Inc., USA.

The fraction of the organosilane is preferably 0.1% to 7% by weight, more particularly 0.2% to 4% by weight, preferably 0.4% to 2% by weight, of the overall composition.

The composition of the invention further comprises at least one organotitanate. Suitable ligands attached to the titanium atom via an oxygen-titanium bond are those which are selected from the group consisting of alkoxy group, sulphonate group, carboxylate group, dialkyl phosphate group, dialkyl pyrophosphate group and acetylacetonate group.

Especially suitable organotitanates have at least one multidentate ligand, also called chelate ligand. The multidentate ligand is more particularly a bidentate ligand.

Particularly suitable organotitanates are those of the formula (V).

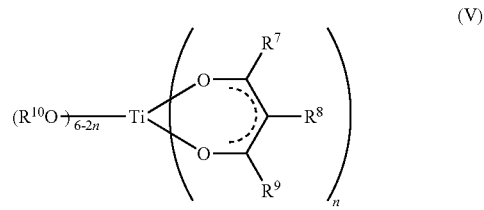

In this formula the radical $R^7$ stands for a hydrogen atom or for a linear or branched alkyl group having 1 to 8 C atoms, more particularly for a methyl group.

The radical $R^8$ stands for a hydrogen atom or for a linear or branched alkyl group having 1 to 8 C atoms which optionally contains heteroatoms, more particularly for a hydrogen atom.

The radical $R^9$ stands for a hydrogen atom or for an alkyl group having 1 to 8, more particularly having 1 to 3, C atoms or for a linear or branched alkoxy group having 1 to 8, more particularly having 1 to 3, C atoms.

The radical $R^{10}$ stands for a linear or branched alkyl radical having 1 to 20 C atoms, more particularly for an isobutyl or for an isopropyl radical.

n stands for a value of 1 or 2, more particularly for 2.

Preferred organotitanates are those of the formula (V) where the radical $R^7$ stands for a methyl group, the radical $R^8$ stands for a hydrogen atom, the radical $R^9$ stands for a methyl group or methoxy or ethoxy group and the radical $R^{10}$ stands for an isobutyl or for an isopropyl radical.

It will be appreciated that it is possible, or in certain cases even preferred, to use mixtures of different organotitanates.

Suitable organotitanates are available commercially, for example, under the trade names Tyzor® AA, GBA, GBO, AA-75, M-65, M-105, DC, BEAT, IBAY from the company DuPont, USA.

The fraction of the organotitanate is preferably 0.1% to 10% by weight, more particularly 0.1% to 4% by weight, preferably 0.1% to 3% by weight, of the overall composition.

Preferably the composition further comprises a filler. The filler influences both the rheological properties of the uncured composition and the mechanical properties and surface nature of the cured composition. Suitable fillers are inorganic and organic fillers, examples being natural, ground or precipitated calcium carbonates, coated where appropriate with fatty acids, especially steric acid, and also barium sulphate ($BaSO_4$, also called Baryte or heavy spar), calcined kaolins, aluminium oxides, aluminium hydroxides, silicas, especially highly disperse silicas from pyrolysis processes, carbon blacks, especially industrially manufactured carbon black, PVC powders or hollow beads. Preferred fillers are calcium carbonates, calcine kaolins, carbon black, highly disperse silicas, and also flame-retardant fillers, such as hydroxides or hydrates, especially hydroxide or hydrates of aluminium, preferably aluminium hydroxide.

It is entirely possible and may even be of advantage to use a mixture of different fillers.

A suitable amount of filler is situated, for example, in the range from 10% to 70% by weight, more particularly 15% to 60% by weight, preferably 30% to 60% by weight, based on the overall composition.

Additionally the composition of the invention may further comprise further constituents. Such constituents are, for example, plasticizers such as esters of organic carboxylic acids or their anhydrides, such as phthalates, examples being dioctyl phthalate, diisononyl phthalate or diisodecyl phthalate, adipates, such as dioctyl adipate, for example, azelates and sebacates, polyols, examples being polyoxyalkylene polyols or polyester polyols, organic phosphorus and sulphonic esters or polybutenes; solvents; fibres, of polyethylene, for example; dies; pigments; rheology modifiers such as thickeners or thixotropic agents, examples being urea compounds, polyamide waxes, bentonites or fumed silicas; adhesion promoters, examples being epoxysilanes, (meth)acrylosilanes, anhydridosilanes or adducts of the aforementioned silanes with primary aminosilanes, and also ureasilanes; crosslinkers, examples being silane-functional oligomers and polymers; drying agents, for example vinyltrimethoxysilane, α-functional silanes such as N-(silylmethyl)-O-methylcarbamates, especially N-(methyidimethoxysilylmethyl)-O-methylcarbamate, (methacryloyloxymethyl)silanes, methoxymethylsilanes, orthoformic esters, calcium oxide or molecular sieves; stabilizers, to counter heat, light radiation and UV radiation, for example; flame retardants; surface-active substances such as wetting agents, flow control agents, deaerating agents or defoamers; biocides such as algicides, fungicides or fungal growth inhibitors; and further substances used typically in moisture-curing compositions.

In principle it is not necessary to use additional catalysts in the composition of the invention. If catalysts are nevertheless employed, suitable examples include metal catalysts in the form of organotin compounds such as dibutyltin dilaurate and dibutyltin diacetylacetonate, organobismuth compounds or bismuth complexes, titanium catalysts, compounds containing amino groups, examples being 1,4-diazabicyclo[2.2.2]octane and 2,2'-dimorpholinodiethyl ether, aminosilanes, and mixtures of the stated catalysts.

It is advantageous to select all of the stated constituents present where appropriate in the composition, more particularly a filler and a catalyst, in such a way that the storage stability of the composition is not adversely affected by the presence of such a constituent; in other words, in such a way that the composition suffers little or no change in its properties, more particularly the application properties and curing properties, in the course of storage. This implies that reactions which lead to the chemical curing of the above-described composition, and especially reactions of the silane groups, do not occur to any significant extent in the course of storage. It is therefore especially advantageous for the stated constituents not to contain, or release during storage, any water, or to contain or release during storage no more than traces of water.

It may therefore be sensible to subject certain constituents to chemical or physical drying before mixing them into the composition.

The composition described above is prepared and kept in the absence of moisture. The composition is stable on storage, which means that in the absence of moisture it can be kept in suitable packaging or in a suitable contrivance, such as a drum, a pouch or a cartridge, for example, for a period ranging from several months up to a year or more, without undergoing alteration to any service-relevant extent in its application properties or in its properties after curing. Typically the storage stability is determined by the measurement of the viscosity or the extrusion force.

When the composition described is applied to at least one solid body or article, the silane groups of the polymer and of the silanes come into contact with moisture. The silane groups have the property of undergoing hydrolysis on contact with moisture. This hydrolysis is accompanied by the formation of organosilanols and, as a result of subsequent condensation reactions, of organosiloxanes. As the outcome of these reactions, which may be accelerated through the use of catalysts, the composition ultimately cures. This process is also referred to as crosslinking.

Alternatively, the water needed for curing may come from the air (atmospheric humidity), or else the above-described composition may be contacted with a water-containing component, by being spread-coated, for example, with a smoothing agent, for example, or by being sprayed, or else the composition during application can have a water-containing component added to it, in the form for example of a hydrous paste, which is mixed in via a static mixer, for example. In the case of curing by means of atmospheric moisture, the composition cures from the outside in. The rate of curing is determined by a variety of factors, such as the rate of diffusion of the water, the temperature, the ambient humidity and the bonding geometry, for example, and generally slows as the curing progresses.

The present invention additionally encompasses the use of an above-described composition as an adhesive, sealant or as a composition for producing coatings.

More particularly the composition of the invention is suitable as an adhesive and/or sealant for the primeness bonding and/or sealing and/or coating of porous substrates, more particularly of porous mineral substrates such as concrete, for example. It has emerged that compositions of the invention lead in particular to an improvement in adhesion after water storage. In the context of the adhesive bonding or sealing of porous substrates such as concrete, water storage has to date always been problematic. One reason for this is that, as a result of the capillary action in porous materials, water is able to get in between the substrate surface and the adhesive or sealant and hence may adversely affect adhesion. Moreover, with compositions of the invention, there is an improvement in the temperature stability in the cured state.

The invention further comprises a method of adhesively bonding two substrates, S1 and S2, comprising the steps of
i) applying a composition as described above to a substrate S1 and/or a substrate S2;
ii) contacting the substrates S1 and S2 via the applied composition within the open time of the composition;
iii) curing the composition by means of water, more particularly in the form of atmospheric moisture;
the substrates S1 and S2 being alike or different from one another.

The invention additionally provides a method of sealing or coating, comprising the steps of i') applying a composition as described above to a substrate S1 and/or between two substrates S1 and S2;

ii') curing the composition by means of water, more particularly in the form of atmospheric moisture;

the substrates S1 and S2 being alike or different from one another.

Particularly suitable substrates S1 and/or S2 are substrates selected from the group consisting of concrete, mortar, brick, tile, plaster, a natural stone such as granite or marble, glass, glass ceramic, metal or metal alloy, wood, plastic and lacquer.

The composition of the invention preferably has a pasty consistency with properties of structural viscosity. A composition of this kind is applied to the substrate, preferably in the form of a bead, by means of a suitable apparatus, said bead advantageously having a substantially round or triangular cross-sectional area. Suitable methods of applying the composition are, for example, its application from commercially available cartridges, which are operated manually or by means of compressed air, or from a drum or Hobbock by means of a conveying pump or an extruder, where appropriate by means of an application robot. A composition of the invention having good application properties exhibits high consistency and short stringing. In other words, it remains in the applied form following application, and hence does not run apart, and, after the application device has been put down, the composition forms either no strings or only a very short string, and so the substrate is not soiled.

Compositions of the invention have good adhesion to substrates, particularly to porous substrates, preferably to porous mineral substrates such as concrete, in particular even without the use of adhesion promoter compositions, also called primers.

The present invention further comprises an article which is bonded, sealed and/or coated with a composition as described and which is obtained by one of the methods described.

These articles preferably comprise a built structure, more particularly a built structure of construction or civil engineering.

EXAMPLES

Test Methods

The adhesion was determined as follows:

The adhesion was tested using DIN concrete, available commercially from the company Rocholl GmbH, Germany. The surface was cleaned with a steel brush and then freed from dust with compressed air. Then two beads of each composition were applied from a cartridge to each substrate. The substrate coated with the beads was then stored under standard conditions (2±1° C., 50±5% relative humidity) for seven days, after which the adhesion was tested for a first time (first bead). Thereafter the substrate with the applied composition was immersed fully in water and stored at room temperature. The adhesion was then tested daily on a part of the bead.

To test the adhesion, the substrate was fixed on the bench by means of a clamp. An incision was made into one end of the cured bead down to just above the surface of the substrate (bond face), and the incised end of the bead was held by hand and then pulled carefully and slowly from the surface with a peeling action, in the direction of the other end of the bead. If, in the course of this operation, the adhesion was so strong that the end of the bead threatened to tear off while being pulled, a sharp blade (cutter) was used to apply a cut perpendicular to the bead pulling direction, down to the surface of the substrate, and in this way a section of the bead was detached. Cuts of this kind were repeated, if necessary, in the course of continued pulling, at intervals of 2 to 3 mm. In this way the entire bead was pulled and/or cut from the substrate. The adhesive properties were evaluated on the basis of the cured adhesive which remained on the substrate surface after the bead had been removed (cohesive fracture), this being accomplished by estimating the cohesive fraction of the adhesion face, in accordance with the following scale:

1=more than 95% cohesive fracture
2=75% to 95% cohesive fracture
3=25% to 75% cohesive fracture
4=less than 25% cohesive fracture Test results with cohesive fracture values of less than 75%, in other words values of 3 and 4, are considered inadequate. Samples whose adhesion properties were evaluated with a value of 4, in other words those with less than 25% cohesive fracture, were subsequently disregarded, and are recorded in the table with "n.d." for "not determined".

The tensile strength, the breaking extension, and the modulus of elasticity at 0% to 100% extension were determined in accordance with DIN EN 53504 (pulling speed: 200 mm/min) on films with a thickness of 2 mm which had been cured at 23° C. and 50% relative humidity for 14 days.

The Shore A hardness was determined in accordance with DIN 53505.

Preparation of the Silane-Functional Polyurethane Polymer (P1-1)

Under a nitrogen atmosphere 1000 g of Acclaims Polyol 12200 (Bayer MaterialScience AG, Germany; low monol polyoxypropylene diol; OH number 11.0 mg KOH/g; water content about 0.02% by weight), 38.4 g of isophorone diisocyanate (IPDI; Vestanat® IPDI, Evonik Degussa GmbH, Germany), 270.1 g of diisodecyl phthalate (DIDP; Palatinol® Z, BASF SE, Germany) and 0.12 g of di-n-butyltin dilaurate (Metatin® K 712, Acima AG, Switzerland) were heated to 90° C. with continual stirring and were left at this temperature until the titrimetrically determined free isocyanate group content had reached a value of 0.40% by weight. Subsequently 39.5 g of diethyl N-(3-tri-methoxysilylpropyl)aminosuccinate were mixed in and the mixture was stirred at 90° C. for 4 hours until free isocyanate was no longer detected by means of IR spectroscopy. The product was cooled to room temperature and kept in the absence of moisture (theoretical polymer content=80%).

Diethyl N-(3-trimethoxysilylpropyl)aminosuccinate was prepared as follows: 51.0 g of 3-aminopropyltrimethoxysilane (Silquest®A-1110, Momentive Performance Materials Inc., USA) were introduced as an initial charge. With thorough stirring, 49.0 g of diethyl maleate (Fluka Chemie GmbH, Switzerland) were added slowly at room temperature and the mixture was stirred at room temperature for 2 hours.

MS Prepolymer (P3-1)

Prepolymer S203H is available from Kaneka Corporation, Japan.

Preparation of the Urea Thickener Paste

A vacuum mixer was charged with 1000 g of diisodecyl phthalate (Palatinol® Z) and 160 g of 4,4'-diphenylmethane diisocyanate (Desmodur® 44 MC L, Bayer MaterialScience AG, Germany) and this initial charge was gently heated. Then 90 g of monobutylamine were added slowly dropwise with vigorous stirring. The white paste formed was stirred for a further hour under vacuum and with cooling. The urea thickener paste contains 20% by weight of urea thickener in 80% by weight of diisodecyl phthalate.

Preparation of the Adhesives

Preparation of the Base Formulation

In a vacuum mixer, in accordance with the weight fractions reported in Table 1, the polymer, vinyltrimethoxysilane (Dynasylan® VTMO, Evonik Degussa GmbH, Germany), titanium oxide (Kronos® 2430, Kronos Titan GmbH, Germany), urea thickener paste, ground chalk (Omya® 5GU, Omya GmbH, Germany), optionally N-2-aminoethyl-3-aminopropyltrimethoxysilane (Dynasylan® DAMO-T, Evonik Degussa GmbH, Germany) or mercaptosilane (Dynasylan® MTMO, Evonik Degussa GmbH, Germany), and optionally DBTDL, Metatin® K712 and DIDP (Palatinol® Z) or organotitanate (Tyzor® IBAY, DuPont, USA), were processed to a homogeneous paste which was kept in the absence of moisture.

TABLE 1

Results

|  | Ref. 1 | B1 | Ref. 2 | B2 |
|---|---|---|---|---|
| P1-1 | 26.9 | 26.9 | | |
| P3-1 | | | 26.9 | 26.9 |
| Dynasylan VTMO | 0.5 | 0.5 | 0.5 | 0.5 |
| Kronos 2430 | 2.0 | 2.0 | 2.0 | 2.0 |
| Urea thickener paste | 19.8 | 19.8 | 19.8 | 19.8 |
| Omya 5 GU | 48.8 | 48.8 | 48.8 | 48.8 |
| Dynasylan DAMO-T | 0.5 | | 0.5 | |
| Dynasylan MTMO | | 1 | | 1 |
| DIDP Palatinol Z | 1.3 | | 1.3 | |
| DBTDL Metatin K712 | 0.2 | | 0.2 | |
| Titanate Tyzor IBAY[1)] | | 1 | | 1 |
| Adhesion to DIN concrete | | | | |
| 7 d Standard conditions | 1 | 1 | 1 | 1 |
| +1 d H$_2$O | 4 | 1 | 1 | 1 |
| +2 d H$_2$O | n.d. | 1 | 3 | 1 |
| +3 d H$_2$O | n.d. | 1 | 4 | 1 |
| +4 d H$_2$O | n.d. | 1 | n.d. | 1 |
| +5 d H$_2$O | n.d. | 1 | n.d. | 1 |
| +6 d H$_2$O | n.d. | 1 | n.d. | 3 |
| +7 d H$_2$O | n.d. | 1 | n.d. | 3 |
| +8 d H$_2$O | n.d. | 1 | n.d. | n.d. |
| +9 d H$_2$O | n.d. | 1 | n.d. | n.d. |
| 14 d Standard conditions | 1 | 1 | 1 | 1 |
| +1 d H$_2$O | 1 | 1 | 1 | 1 |
| +2 d H$_2$O | 2 | 1 | 1 | 1 |
| +3 d H$_2$O | 4 | 1 | 3 | 1 |
| +4 d H$_2$O | n.d. | 1 | 3 | 1 |
| +5 d H$_2$O | n.d. | 1 | n.d. | n.d. |
| +6 d H$_2$O | n.d. | 1 | n.d. | n.d. |
| +7 d H$_2$O | n.d. | 1 | 4 | 3 |
| +8 d H$_2$O | n.d. | 1 | n.d. | n.d. |
| +9 d H$_2$O | n.d. | 1 | n.d. | n.d. |
| Mechanical properties[2)] | | | | |
| Tensile strength [MPa] | 1.10 | 1.15 | 1.07 | 0.69 |
| Breaking extension [%] | 259 | 394 | 316 | 385 |
| Elasticity modulus [MPa] 0-100% | 0.40 | 0.49 | 0.36 | 0.28 |
| Shore A hardness | 25 | 31 | 21 | 15 |

Composition in weight fractions [% by weight] and results;
[1)]The fraction of the titanate (B1 and B2) is selected such that the cure rates of the compositions are comparable with those of Ref. 1 and Ref. 2.
[2)]After 14 days' storage at 23° C. and 50% relative humidity.

The invention claimed is:
1. Composition comprising
   (a) at least one silane-functional polymer P, wherein the silane-functional polymer P is selected from:
      (i) a silane-functional polyurethane P1 obtained by the reaction of a silane containing at least one group that is reactive towards isocyanate groups with a polyurethane polymer having isocyanate groups, and
      (ii) a silane-functional organic polymer P3 obtained by a hydrosilation reaction of polymers having terminal double bonds, such polymers being poly(meth)acrylate polymers;
   (b) at least one organosilane which contains at least one sulphur atom; and
   (c) at least one organotitanate having at least one multidentate ligand,
   wherein the composition comprises no additional catalysts other than organotin compounds, organobismuth compounds, bismuth complexes, 1,4-diazabicyclo[2.2.2]octane, 2,2'-dimorpholinodiethyl ether, aminosilanes, and mixtures of such additional catalysts.

2. Composition according to claim 1, wherein the silane-functional polymer P contains end groups of the formula (I)

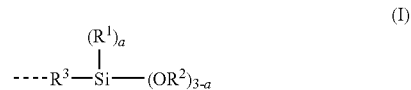

(I)

where
R$^1$ stands for an alkyl group having 1 to 8 C atoms;
R$^2$ stands for an acyl or alkyl group having 1 to 5 C atoms;
R$^3$ stands for a linear or branched, optionally cyclic, alkylene group having 1 to 12 C atoms, optionally with aromatic fractions, and optionally with one or more heteroatoms; and
a stands for a value of 0 or 1 or 2.

3. Composition according to claim 1, wherein the organosilane which contains at least one sulphur atom is an organosilane of the formula (II)

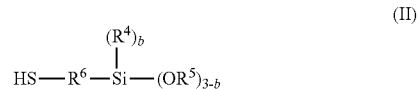

(II)

where
the radical R$^4$ stands for an alkyl group having 1 to 8 C atoms;
the radical R$^5$ stands for a methyl or for an ethyl group;
the radical R$^6$ stands for a linear alkylene group having 1 to 10 C atoms; and
b stands for a value of 0.

4. Composition according to claim 1, wherein the organotitanate is an organotitanate of the formula (V)

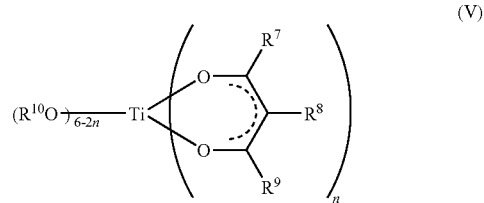

(V)

where
the radical R$^7$ stands for a hydrogen atom or for a linear or branched alkyl group having 1 to 8 C atoms;
the radical R$^8$ stands for a hydrogen atom or for a linear or branched alkyl group having 1 to 8 C atoms which optionally contains heteroatoms;
the radical R$^9$ stands for a hydrogen atom or for an alkyl group having 1 to 8 C atoms or for a linear or branched alkoxy group having 1 to 8 C atoms;
the radical R$^{10}$ stands for a linear or branched alkyl radical having 1 to 20 C atoms; and
n stands for a value of 1 or 2.

5. Composition according to claim 1, wherein the fraction of the organosilane is 0.1% to 7% by weight, of the overall composition.

6. Composition according to claim 1, wherein the fraction of the organotitanate is 0.1% to 10% by weight, of the overall composition.

7. Composition according to claim 1, wherein the composition further comprises at least one filler.

8. Composition according to claim 7, wherein the fraction of the filler is 10% to 70% by weight, of the overall composition.

9. An adhesive, sealant, or coating composition comprising the composition according to claim 1.

10. An adhesive or sealant composition for primerless bonding or sealing of porous substrates comprising the composition according to claim 1.

11. Method of adhesively bonding two substrates, S1 and S2, comprising the steps of
applying a composition according to claim 1 to a substrate S1 and/or a substrate S2;
contacting the substrates S1 and S2 via the applied composition within an open time of the composition;
curing the composition with water;
the substrates S1 and S2 being alike or different from one another.

12. Method of sealing or coating, comprising the steps of
i') applying a composition according to claim 1 to a substrate S1 and/or between two substrates S1 and S2;
ii') curing the composition with water;
the substrates S1 and S2 being alike or different from one another.

13. Method according to claim 11, wherein at least one of the substrates, S1 or S2, is selected from the group consisting of concrete, mortar, brick, tile, plaster, natural stone, glass, glass ceramic, metal, metal alloy, wood, plastic and lacquer.

14. Article bonded, sealed or coated by a method according to claim 11.

15. Article according to claim 14, wherein the article is a built structure.

16. The method of claim 11, wherein the method does not utilize a primer.

17. Composition according to claim 1, wherein the at least one ligand is an acetylacetonate group.

18. Composition according to claim 1, wherein the composition comprises no additional catalysts.

19. Composition comprising
(a) at least one silane-functional polymer P, wherein the silane-functional polymer P is selected from:
(i) a silane-functional polyurethane P1 obtained by the reaction of a silane containing at least one group that is reactive towards isocyanate groups with a polyurethane polymer having isocyanate groups,
(ii) a silane-functional polyurethane P2 obtained by the reaction of an isocyanatosilane with a polymer having functional end groups that are reactive towards isocyanate groups, and
(iii) a silane-functional organic polymer P3 obtained by a hydrosilation re action of polymers having terminal double bonds;
(b) at least one organosilane which contains at least one sulphur atom; and
(c) at least one organotitanate;
wherein the organosilane which contains at least one sulphur atom is an organosilane of the formula (IV)

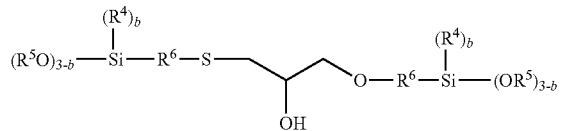

where
the radical $R^4$ stands for an alkyl group having 1 to 8 C atoms;
the radical $R^5$ stands for an alkyl group having 1 to 5 C atoms, or for an acyl group;
the radical $R^6$ stands for a linear or branched, optionally cyclic, alkylene group having 1 to 20 C atoms, optionally with aromatic fractions, and optionally with one or more heteroatoms; and
b stands for a value of 0 or 1 or 2.

20. A composition comprising
(a) at least one silane-functional polymer P, wherein the silane-functional polymer P is a silane-functional polyurethane obtained by the reaction of a silane containing at least one group that is reactive towards isocyanate groups with a polyurethane polymer having isocyanate groups;
(b) at least one organosilane which contains at least one sulphur atom; and
(c) at least one organotitanate, wherein the organotitanate is an organotitanate of the formula (V)

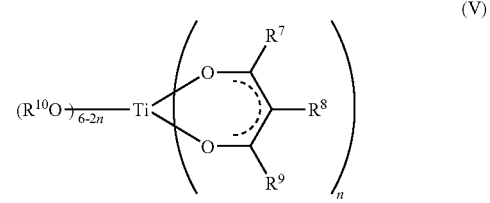

where
the radical $R^7$ stands for a hydrogen atom or for a linear or branched alkyl group having 1 to 8 C atoms;
the radical $R^8$ stands for a hydrogen atom or for a linear or branched alkyl group having 1 to 8 C atoms which optionally contains heteroatoms;
the radical $R^9$ stands for a hydrogen atom or for an alkyl group having 1 to 8 C atoms or for a linear or branched alkoxy group having 1 to 8 C atoms;
the radical $R^{10}$ stands for a linear or branched alkyl radical having 1 to 20 C atoms; and
n stands for a value of 1 or 2;
wherein the composition comprises no additional catalysts other than organotin compounds, organobismuth compounds, bismuth complexes, 1,4-diazabicyclo[2.2.2]octane, 2,2'-dimorpholinodiethyl ether, aminosilanes, and mixtures of such additional catalysts.

21. Composition comprising
(a) at least one silane-functional polymer obtained by the reaction of an isocyanatosilane with a polyurethane polymer containing hydroxyl groups;
(b) at least one organosilane which contains at least one sulphur atom; and
(c) at least one organotitanate having at least one multidentate ligand, wherein the composition comprises no additional catalysts other than organotin compounds, organobismuth compounds, bismuth complexes, 1,4-diazabicyclo[2.2.2]octane, 2,2'-dimorpholinodiethyl ether, aminosilanes, and mixtures of such additional catalysts.

22. Composition comprising
(a) at least one silane-functional polymer obtained by the reaction of an isocyanatosilane with a polymer having functional end groups that are reactive towards isocyanate groups, in an amount of 10-60 percent by weight of the composition;
(b) at least one organosilane which contains at least one sulphur atom, in an amount of 0.4 to 7 percent by weight of the composition; and
(c) at least one organotitanate having at least one multidentate ligand,
wherein the composition comprises no additional catalysts other than organotin compounds, organobismuth compounds, bismuth complexes, 1,4-diazabicyclo[2.2.2]octane, 2,2'-dimorpholinodiethyl ether, aminosilanes, and mixtures of such additional catalysts.

* * * * *